(No Model.)
W. S. GUBELMANN.
DISINFECTING DEVICE.
No. 436,130. Patented Sept. 9, 1890.
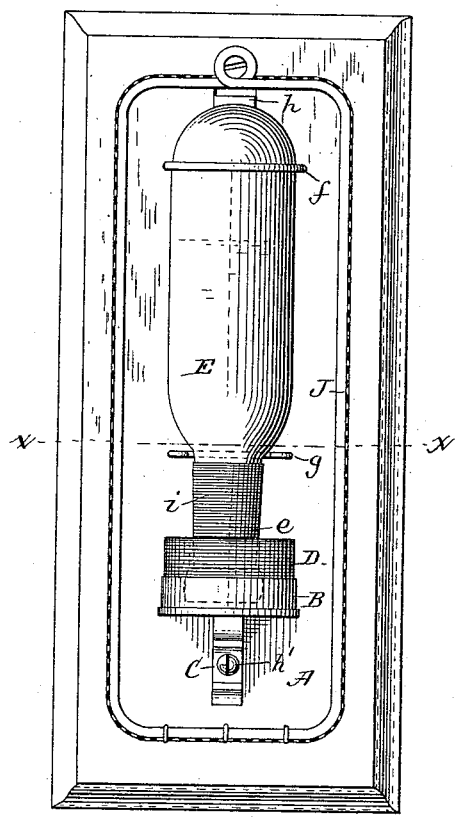
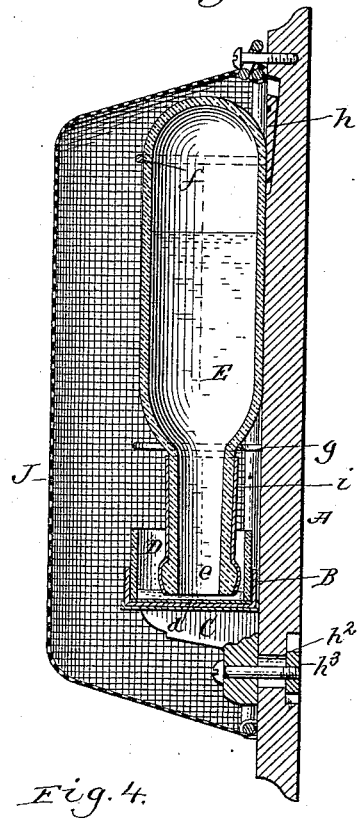
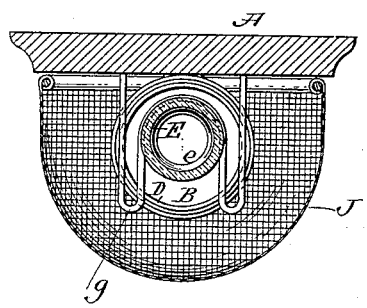
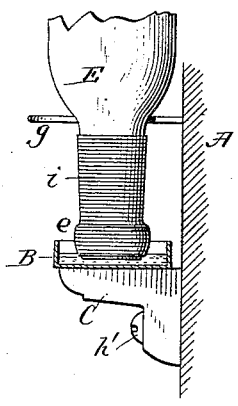
Witnesses:
Chas. J. Buchheit.
Emil Neuhart.
Inventor:
W. S. Gubelmann
By Wilhelm Bonnet
Attorneys.

UNITED STATES PATENT OFFICE.

WILLIAM S. GUBELMANN, OF BUFFALO, NEW YORK.

DISINFECTING DEVICE.

SPECIFICATION forming part of Letters Patent No. 436,130, dated September 9, 1890.

Application filed March 11, 1890. Serial No. 343,478. (No model.)

*To all whom it may concern:*

Be it known that I, WILLIAM S. GUBELMANN, a citizen of the United States, residing at Buffalo, in the county of Erie and State of New York, have invented new and useful Improvements in Disinfectors, of which the following is a specification.

This invention relates to the disinfecting devices which are used in dwellings, hospitals, &c., for purifying and deodorizing the air and for destroying noxious gases arising from sewers, closets, and other sources of contamination.

The principal object of my invention is to produce an inexpensive disinfector which will automatically supply a disinfecting agent for a considerable period of time without requiring attention.

The invention has the further objects to so construct the device that the disinfectant holder or vessel may be conveniently removed from its support for refilling it, when necessary, and to render the device adjustable, so that its evaporating capacity may be regulated in accordance with the size of the room to be disinfected and the nature of the gases to be destroyed.

In the accompanying drawings, Figure 1 is a front elevation of my improved device with the inclosing cage or casing in section. Fig. 2 is a vertical section of the device. Fig. 3 is a horizontal section thereof in line $x\ x$, Fig. 1. Fig. 4 is a fragmentary vertical section of the disinfector on an enlarged scale, showing a small pan below the disinfectant holder.

Like letters of reference refer to like parts in the several figures.

A represents a board or plate, which carries the parts of the disinfector and which is secured to the wall of the room by screws or other means.

B represents a shallow evaporating pan or vessel, which rests upon a bracket C, attached to the front side of the board A, near the lower end thereof.

D represents a cylindrical wick or tube, of felt or other absorbent material, arranged in the evaporating pan or dish B, and projecting upwardly beyond the pan, so as to have a considerable portion of its area exposed to the surrounding air. A disk $d$ of absorbent material is preferably placed in the bottom of the pan.

E represents a disinfectant holder or receptacle arranged above the pan B and extending with its open lower end or mouth $e$ into the pan, and preferably to within a short distance from the bottom thereof, as shown. This holder preferably consists of an inverted bottle. The holder is removably attached to the base-board A by a wire ring or band $f$ encircling the upper portion of the holder, and a U-shaped bracket $g$, embracing the neck or contracted portion of the holder and upon which the shoulder of the holder rests. This bracket $g$ is open at its front side, so that the holder can be readily removed from the board A by moving its lower portion outwardly and withdrawing it from the upper ring $f$. The holder is preferably clamped in position in its supports by a wedge $h$, which is inserted between the holder and the board A, as represented in Fig. 2. The liquid disinfectant rises in the pan B to a level with the mouth of the holder E, the liquid being held in the holder by the atmospheric pressure upon the surface of the liquid in the pan. As the evaporation proceeds, the level of the liquid in the pan falls below the mouth of the holder and air enters the holder, allowing the liquid to escape from the holder until it again rises to a level with the mouth thereof, when the further escape of the liquid is again arrested. The wick D becomes saturated with the disinfecting-liquid contained in the pan B and the liquid evaporates and commingles with the air of the room, purifying and deodorizing the same and destroying any infectious germs or impurities.

By my improved disinfector the disinfectant is automatically and uniformly supplied to the pan and wick until exhausted, without requiring any attention, and the liquid is allowed to escape from the holder only as fast as it is evaporated, whereby the strength of the liquid is preserved until wholly exhausted while supplying a sufficient quantity to the pan to keep the wick thoroughly and evenly saturated. The holder is charged by removing it from the board A and filling it with its mouth upward. The pan B is then placed over the mouth of the holder and the latter is inverted and replaced in its supports on the board A.

When the disinfector is used in a large room or in places where the air is highly vitiated, a comparatively large pan B and evaporating-wick D are used, as represented in Fig. 1; but when the device is used in a small room or in places where the air contains a small percentage of impurities, a small pan may be employed, as represented in Fig. 4, while in some cases where the air is comparatively pure the wick may be omitted, a sufficient amount of the disinfectant being evaporated at the surface of the liquid in the pan to purify the air.

When a large wick is employed, a correspondingly increased quantity of liquid is required to thoroughly saturate the wick, and for this purpose the bracket C, which supports the pan B, is preferably made vertically adjustable, so that the pan may be adjusted toward and from the mouth of the disinfectant-holder to vary the distance between the bottom of the pan and the mouth of the holder and regulate the quantity of liquid in the pan in accordance with the evaporating capacit desired.

The bracket is adjustably secured to the board A by a bolt or screw $h'$, arranged in a vertical slot $h^2$ in the board and provided with a clamping-nut $h^3$, which is countersunk in a recess in the rear side of the board, as represented in Fig. 2.

The neck of the bottle or holder is preferably enveloped with a covering of absorbent material $i$, extending to the open end of the bottle. This absorbent covering furnishes increased evaporating-surface and also avoids soiling of the upper portion of the bottle.

The holder and pan of the disinfector are protected by a cage or casing J, of wire or perforated sheet metal. This cage is preferably hinged at one end to the board A and detachably secured at its opposite end by a suitable fastening, so that the same may be swung away from the board or plate A to give access to the holder and pan.

I claim as my invention—

1. In a disinfector, the combination, with a supporting board or plate having a horizontal band or ring and a U-shaped bracket arranged below said ring, of an inverted disinfectant-bottle arranged with its upper portion in said ring and supported with its shoulder upon said U-shaped bracket, and an open pan supported upon said plate or board underneath the bottle and surrounding the mouth thereof, substantially as set forth.

2. In a disinfector, the combination, with a supporting board or plate having a horizontal band or ring and a U-shaped bracket arranged below said ring, of an inverted disinfectant-bottle arranged with its upper portion in said ring and supported with its shoulder upon said U-shaped bracket, an open pan supported upon said plate or board underneath the bottle and surrounding the mouth thereof, and an evaporating-wick immersed in said pan, substantially as set forth.

3. In a disinfector, the combination, with a supporting board or plate having a horizontal band or ring and a U-shaped bracket arranged below said ring, of an inverted disinfectant-bottle arranged with its upper portion in said ring and supported with its shoulder upon said U-shaped bracket, a wedge whereby the bottle is clamped in said ring, and an open pan supported upon said board and into which the mouth of the bottle projects, substantially as set forth.

4. In a disinfector, the combination, with a supporting board or plate having a horizontal band or ring and a U-shaped bracket arranged below said ring, of an inverted disinfectant-bottle arranged with its upper portion in said ring and supported with its shoulder upon said U-shaped bracket, an open pan supported upon said plate or board underneath the bottle and surrounding the mouth thereof, and a movable perforated guard or cage inclosing the parts of the disinfector, substantially as set forth.

5. The combination, with the supporting plate or board and the pan or receptacle supported thereon, of an inverted disinfectant holder or bottle attached to the supporting-plate above said pan and having its mouth arranged in the pan, and a wick or absorbent covering enveloping the neck of the holder, substantially as set forth.

Witness my hand this 5th day of March, 1890.

WILLIAM S. GUBELMANN.

Witnesses:
CARL F. GEYER,
FRED. C. GEYER.